United States Patent
Fang et al.

(10) Patent No.: US 12,130,462 B2
(45) Date of Patent: Oct. 29, 2024

(54) LIGHT GUIDE PLATE, BACKLIGHT MODULE, OPTICAL COMPONENT AND DISPLAY DEVICE

(71) Applicant: Radiant Opto-Electronics Corporation, Kaohsiung (TW)

(72) Inventors: I-Wen Fang, Kaohsiung (TW); Chia-Ying Chen, Kaohsiung (TW); Yen-Chang Lee, Kaohsiung (TW); Chun-Hsien Li, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/340,908

(22) Filed: Jun. 26, 2023

(65) Prior Publication Data

US 2023/0333305 A1    Oct. 19, 2023

Related U.S. Application Data

(63) Continuation of application No. PCT/CN2022/136511, filed on Dec. 5, 2022.

(30) Foreign Application Priority Data

Dec. 14, 2021    (CN) .......................... 202111525938.1

(51) Int. Cl.
*F21V 8/00*    (2006.01)
(52) U.S. Cl.
CPC ................................. *G02B 6/0035* (2013.01)
(58) Field of Classification Search
CPC ........... F21V 7/00; G02B 5/08; G02B 6/0035; G02B 5/02; G02F 1/1336; G02F 1/133615
See application file for complete search history.

(56) References Cited

U.S. PATENT DOCUMENTS

| | | | |
|---|---|---|---|
| 2004/0109105 A1* | 6/2004 | Nagakubo | G02B 6/0055 349/65 |
| 2017/0276861 A1* | 9/2017 | Watanabe | G02B 6/0033 |

FOREIGN PATENT DOCUMENTS

| | | | |
|---|---|---|---|
| CN | 1700070 A | | 11/2005 |
| CN | 101368685 A | | 2/2009 |
| CN | 101738670 A | * | 6/2010 |
| CN | 102156320 A | | 8/2011 |
| CN | 104712965 A | | 6/2015 |
| CN | 204758976 U | | 11/2015 |
| CN | 105353560 A | | 2/2016 |
| CN | 111812875 A | | 10/2020 |
| CN | 217279005 U | | 8/2022 |
| JP | H0728061 A | * | 1/1995 |

(Continued)

*Primary Examiner* — Fatima N Farokhrooz
(74) *Attorney, Agent, or Firm* — CKC & Partners Co., LLC (57) ABSTRACT

A light guide plate, a backlight module and a display device are provided. The light guide plate includes a main body and an optical layer. The main body has a light-incident surface, a side surface and an optical surface. The light-incident surface and the side surface are respectively connected to the optical surface. The optical layer is correspondingly disposed on the side surface of the main body. In a reflectance characteristic of the optical layer, a total reflectance of the reflectance characteristic is composed of the diffuse reflectance and the parallel reflectance. The percentage value of the parallel reflectance to the total reflectance is less than 45 and larger than 25, including the end point.

15 Claims, 3 Drawing Sheets

(56) References Cited

FOREIGN PATENT DOCUMENTS

| | | | |
|---|---|---|---|
| JP | H07128526 A | | 5/1995 |
| JP | 2011197220 A | | 10/2011 |
| JP | 2015228309 A | | 12/2015 |
| JP | 2019200862 A | * | 11/2019 |
| TW | 201740170 A | | 11/2017 |
| TW | 201943552 A | | 11/2019 |
| TW | 201944136 A | | 11/2019 |
| TW | 202006407 A | | 2/2020 |
| WO | 2012086221 A1 | | 6/2012 |

* cited by examiner

LIGHT GUIDE PLATE, BACKLIGHT MODULE, OPTICAL COMPONENT AND DISPLAY DEVICE

RELATED APPLICATIONS

This application is a continuation application of International Application No. PCT/CN2022/136511 filed on Dec. 5, 2022, which claims priority to China Application Serial Number 202111525938.1, filed on Dec. 14, 2021. The entire contents of each of which are incorporated by reference.

BACKGROUND

Field of Invention

The present disclosure relates to a light guide element and its application, and more particularly, to a light guide plate and a backlight module and an optical component and a display device using the light guide plate.

Description of Related Art

A conventional edge-type backlight module mainly includes a light source and a light guide plate. The light guide plate includes a light-incident side surface, an opposite light-incident surface, a light-emitting surface and a reflective surface, wherein the light-incident side surface is opposite to the opposite light-incident surface, and the reflective surface is opposite to the light-emitting surface and is connected to the light-incident side surface and the opposite light-incident surface. Therefore, after the light provided by the light source enters an interior of the light guide plate from the light-incident side surface, the light can be reflected in the interior of the light guide plate and emitted from the light-emitting surface.

However, when a portion of the light travels to the opposite light-incident surface, it is emitted out of the opposite light-incident surface, which results in the problems of light leakage or bright lines.

SUMMARY

Therefore, an objective of the present disclosure is to provide a light guide plate, a backlight module, an optical component and a display device, wherein the light guide plate can fully use the light, and can solve the problems of light leakage or bright lines existing in the conventional light guide plate.

According to the aforementioned objectives, the present disclosure provides a light guide plate. The light guide plate includes a main body and an optical layer. The main body has a light-incident surface, a side surface and an optical surface. The light-incident surface and the side surface are respectively connected to the optical surface. The optical layer is correspondingly disposed on the side surface of the main body. In a reflectance characteristic of the optical layer, a total reflectance of the reflectance characteristic is composed of a diffuse reflectance and a parallel reflectance. A percentage value of the parallel reflectance to the total reflectance is defined as an R, and a value of the R is less than 45 and larger than 25, including the end point.

According to one embodiment of the present disclosure, the reflectance characteristic is that light is reflected into the main body by the optical layer.

According to one embodiment of the present disclosure, the main body defines a plurality of light-emitting areas arranged in a matrix. A ratio of an average brightness of the light-emitting areas closest to two opposite sides of the main body to a brightness of the light-emitting area located on a center of the main body is an $R_L$, and the R and the $R_L$ conform to a relational formula, the relational formula is:

$$1 > R_L \geq 7*10^{-6}R^3 - 0.0012R^2 + 0.0582R - 0.0015.$$

According to one embodiment of the present disclosure, a value of the $R_L$ is larger than 0.8 and less than 1.

According to one embodiment of the present disclosure, the value of the $R_L$ is larger than 0.845 and less than 0.875.

According to one embodiment of the present disclosure, a ratio of the diffuse reflectance to the parallel reflectance of the optical layer is less than 7.33 and larger than 0.12, including the end point. A thickness of the main body is larger than 0.7 mm and less than 1 mm, including the end point.

According to one embodiment of the present disclosure, the ratio of the diffuse reflectance to the parallel reflectance of the optical layer is less than 1.875, including the end point.

According to one embodiment of the present disclosure, a ratio of the diffuse reflectance to the parallel reflectance of the optical layer is less than 1.875 and larger than 1.21, including the end point. A thickness of the main body is less than 1 mm, including the end point.

According to one embodiment of the present disclosure, the thickness of the main body is larger than 0.35 mm and less than 0.7 mm, including the end point. The ratio of the diffuse reflectance to the parallel reflectance of the optical layer is larger than 1.3, including the end point.

According to one embodiment of the present disclosure, a ratio of the diffuse reflectance to the parallel reflectance of the optical layer is less than 1.27 and larger than 0.12, including the end point. A thickness of the main body is larger than 0.7 mm and less than 1 mm, including the end point.

According to one embodiment of the present disclosure, a ratio of the diffuse reflectance to the parallel reflectance of the optical layer is less than 1.27 and larger than 1.1, including the end point. A thickness of the main body is larger than 0.55 mm and less than 1 mm, including the end point.

According to one embodiment of the present disclosure, the light-incident surface directly contacts the side surface.

According to the aforementioned objectives, the present disclosure provides a backlight module. The backlight module includes the aforementioned light guide plate, a light source and at least one optical film. The light source is adjacent to the light-incident surface of the light guide plate. The optical film is arranged in front of the optical surface of the light guide plate.

According to the aforementioned objectives, the present disclosure provides an optical component. The optical component includes a reflectance characteristic. The reflectance characteristic is composed of a diffuse reflectance and a parallel reflectance. A percentage value of the parallel reflectance to a total reflectance is defined as an R. A value of the R is less than 45 and larger than 25, including the end point.

According to one embodiment of the present disclosure, the optical component includes a main body and an optical layer. The main body has a light-incident surface, a side surface and an optical surface. The light-incident surface and the side surface are respectively connected to the optical surface. The optical layer is correspondingly disposed on the side surface of the main body. The optical layer includes the reflectance characteristic.

According to one embodiment of the present disclosure, the main body defines a plurality of light-emitting areas arranged in a matrix. A ratio of an average brightness of the light-emitting areas closest to two opposite sides of the main body to a brightness of the light-emitting area located on a center of the main body is an $R_L$, and the R and the $R_L$ conform to a relational formula, the relational formula is:

$$1 > R_L \geq 7*10^{-6}R^3 - 0.0012R^2 + 0.0582R - 0.0015.$$

According to one embodiment of the present disclosure, a value of the $R_L$ is larger than 0.8 and less than 1.

According to one embodiment of the present disclosure, the value of the $R_L$ is larger than 0.845 and less than 0.875.

According to the aforementioned objectives, the present disclosure provides a display device. The display device includes a light guide plate, a light source, at least one optical film and a display panel. The light source is adjacent to the light-incident surface of the light guide plate. The optical film is arranged in front of the optical surface of the light guide plate. The display panel is arranged in front of the at least one optical film.

It can be known from the aforementioned description, the present disclosure mainly disposes the optical layer on the side surface of the light guide plate. Through the optical layer disposed on the side surface of the light guide plate and the designed percentage value of the diffuse reflectance to the parallel reflectance of the optical layer, it can reduce the light emit out from the side surface of the light guide plate, and increase the light utilization rate of the light guide plate, so that the light leakage and the bright lines can be solved, thereby increasing the optical quality of the overall backlight module and the display device. In other words, a value, which is less than or larger than the percentage value of the parallel reflectance to the total reflectance of the present disclosure, can't achieve a good effect of solving the light leakage and the bright lines. The light guide plate of the present disclosure can improve the aforementioned purpose, so it can further meet the requirements and expectations of the market for narrow frame backlight modules.

BRIEF DESCRIPTION OF THE DRAWINGS

In order to make the above and other objectives, features, advantages, and embodiments of the present disclosure more comprehensible, the accompanying drawings are described as follows.

DETAILED DESCRIPTION

Figure 1:
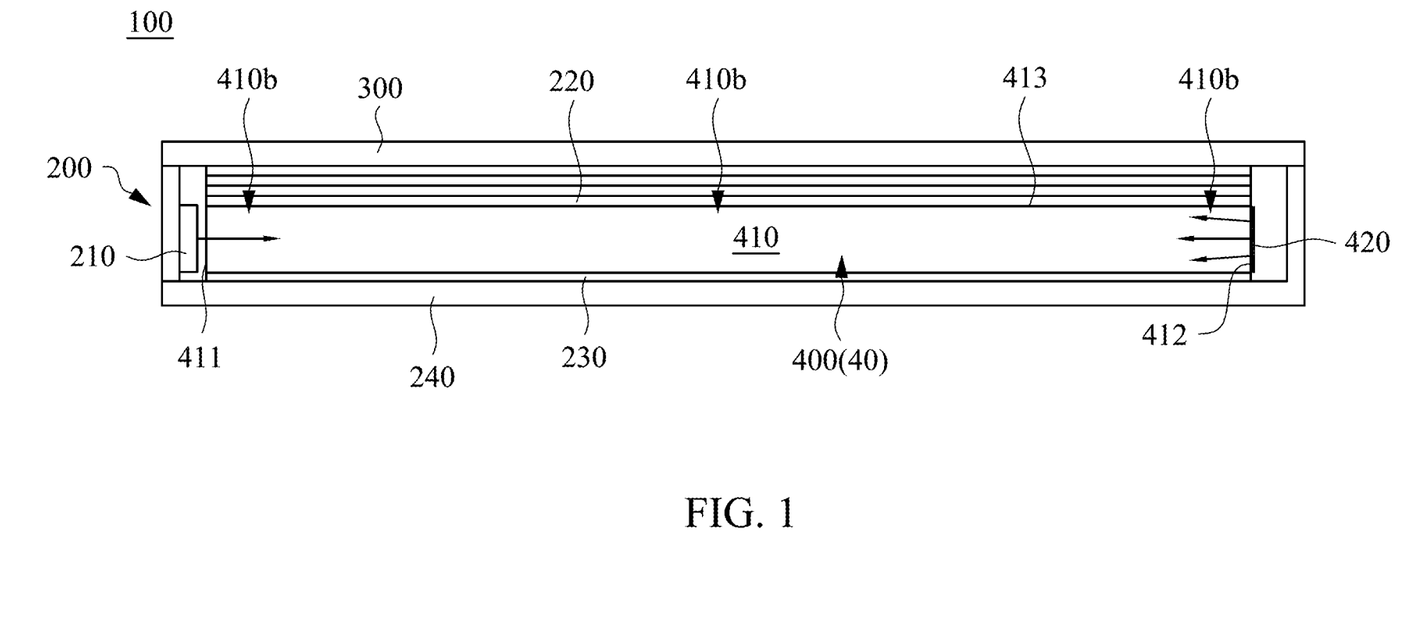
FIG. 1 is a schematic diagram of a display device in accordance with an embodiment of the present disclosure.

Referring to FIG. 1, which is a schematic diagram of a display device in accordance with an embodiment of the present disclosure. The display device 100 in the present embodiment includes a backlight module 200 and a display panel 300 arranged in front of the backlight module 200. As shown in FIG. 1, the backlight module 200 includes a light source 210, an optical component 40, specifically a light guide plate 400, at least one optical film 220, a reflective sheet 230 and a back plate 240. The light source 210, the reflective sheet 230, the light guide plate 400 and the optical film 220 are all carried by the back plate 240. The light source 210 is adjacent to the light guide plate 400, and is mainly used to provide the light to the light guide plate 400, so that the light passes through the light guide plate 400 to form a surface light source. The reflective sheet 230 is disposed on a bottom of the light guide plate 400 to reflect the light emitted from the bottom of the light guide plate 400 back into the light guide plate 400. In the present embodiment, a side surface of the light guide plate 400 is proved with an optical layer 420, which can reduce the light leaking from the light guide plate 400.

In one example, the optical component 40 has a reflectance characteristic. The reflectance characteristic is composed of a diffuse reflectance and a parallel reflectance. A percentage value of the parallel reflectance to a total reflectance is defined as an R. A value of the R is less than 45 and larger than 25, including the end point. Furthermore, the optical component 40 includes a main body 410 and the optical layer 420. The main body 410 has a light-incident surface 411, a side surface 412 and an optical surface 413. The light-incident surface 411 and the side surface 412 are respectively connected to the optical surface 413. The optical layer 420 is correspondingly disposed on the side surface 412 of the main body 410. The optical layer 420 includes the reflectance characteristic.

Specifically, as shown in FIG. 1, the light guide plate 400 includes the main body 410 and the optical layer 420. The main body 410 of the light guide plate 400 includes the light-incident surface 411, the side surface 412 and the optical surface 413. The light-incident surface 411 and the side surface 412 are respectively connected to the optical surface 413. In an example, the optical surface 413 is a light-emitting surface. In the present example, the optical layer 420 is disposed on the side surface 412 to reflect the light passing through the main body 410. In the present example, the side surface 412 refers to external side face of the main body 410 having a thickness, which may be an opposite light-incident surface or other side surface including the opposite light-incident surface, and is not used as a light-incident surface. In some examples, the optical layer 420 directly contacts the side surface 412. In other examples, the optical layer 420 is formed on the side surface 412 by gluing, coating, transfer printing or evaporating. Therefore, the light provided by the light source 210 enters an interior of the light guide plate 400 and travels to the side surface 412, the light can be reflected back into the light guide plate 400 by the optical layer 420 disposed on the side surface 412 to further utilize the light.

Figure 2:
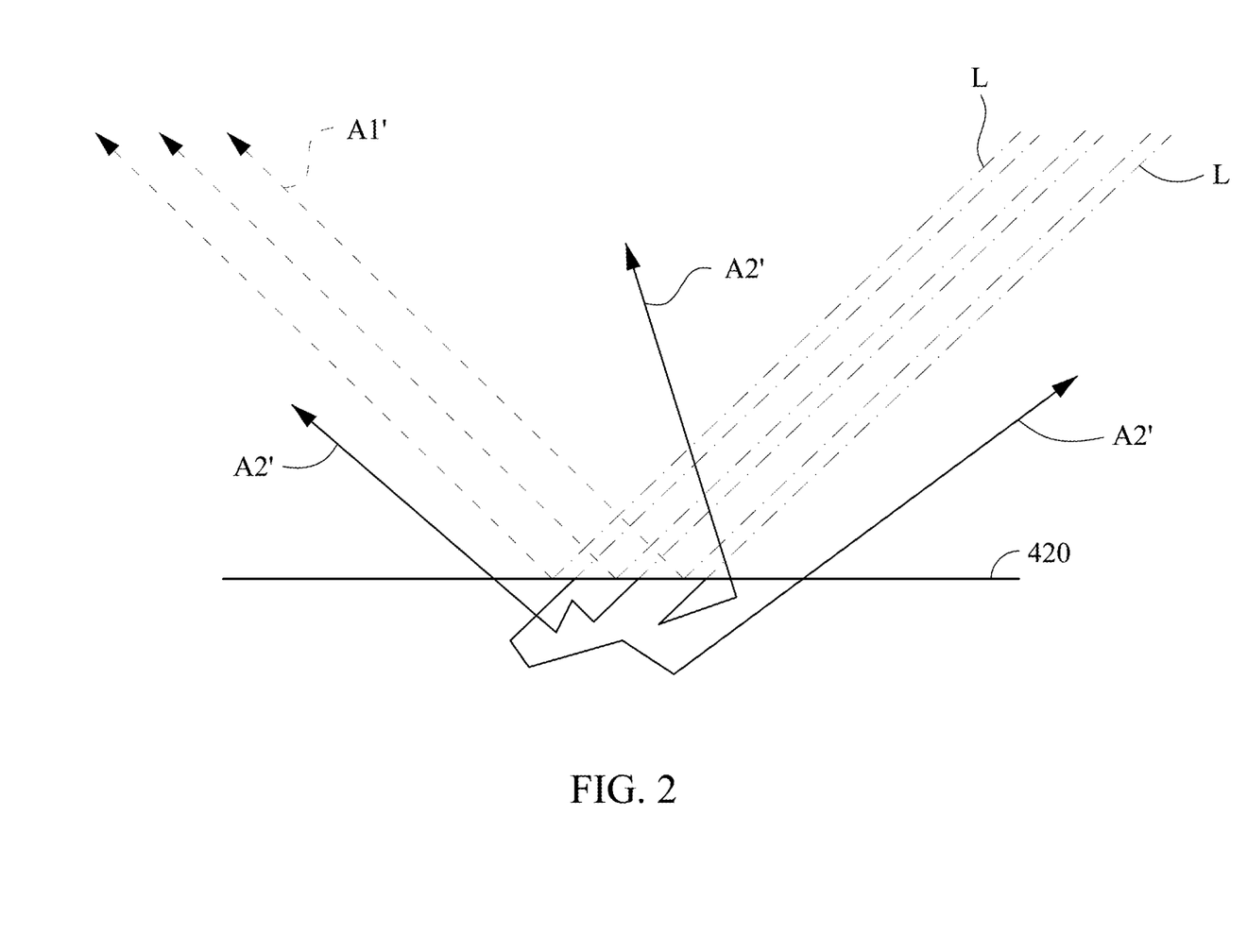
FIG. 2 is a schematic diagram of optical paths of diffuse reflection and parallel reflection after the light emits to an optical layer in accordance with an embodiment of the present disclosure.

In the present example, the optical layer 420 has the reflectance characteristic due to its material properties, the reflectance characteristic includes the total reflectance, the diffuse reflectance and the parallel reflectance, and the total reflectance is the sum of the diffuse reflectance and the parallel reflectance. The reflectance characteristic is that light is reflected into the main body 410 by the optical layer 420. Referring to FIG. 2, FIG. 2 is a schematic diagram of optical paths of diffuse reflection and parallel reflection after the light emits to an optical layer 420 in accordance with an embodiment of the present disclosure. As shown in FIG. 2, a portion of rays of light L strike a surface of the optical layer 420, the rays of the light A1' reflected by the optical layer 420 are regularly reflected, and the rays of the reflected light A1' are parallel to each other; and another portion of the rays of the light L strike the surface of the optical layer 420, the rays of the light A2' reflected by the optical layer 420 are not parallel to each other and are irregularly reflected along different directions.

In an example, the thickness of the main body 410 of the light guide plate 400 is less than 1 mm, including the end point. In other examples, when a ratio of the diffuse reflectance to the parallel reflectance of the optical layer 420 is less than 1, the thickness of the main body 410 of the light guide plate 400 is larger than 0.35 mm.

Referring to the following table 1, the following table 1 is a comparison table of optical simulated results produced by the optical layers 420 with different reflectance in plural examples of the present disclosure and a comparative example. In the table 1, the mark "○" indicates that the luminance and the optical quality of the portion of the light guide plate 400 near an edge of the light guide plate 400 meet requirements and no adverse performance occur; the mark "Δ" indicates that the luminance and the optical quality of the portion of the light guide plate 400 near the edge are slightly declined, but still meet the requirements of a lower standard; and the mark "X" indicates that the luminance and the optical quality of the portion of the light guide plate 400 near the edge do not meet the requirements, for example bright lines, dark halos, or other undesirable performance occur.

example 5, when the ratio of the diffuse reflectance to the parallel reflectance of the optical layer 420 is less than 1.875 and larger than 1.21, the problem of bright lines can be avoided by coordinating with the light guide plates 400 with different thicknesses, that is, the thickness of the main body is less than 1 mm. Even when the ratio of the diffuse reflectance to the parallel reflectance is larger than 1.3, it can be applied to thinner light guide plates 400, whose thicknesses are larger than 0.35 mm and less than 0.7 mm, to make the light guide plates 400 generate a better optical quality.

Regarding the example 1 and the example 2, the ratio of the diffuse reflectance to the parallel reflectance of the optical layer 420 in each of the example 1 and the example 2 is larger than 5, and only when the thickness of the main body 410 is 0.7 mm to 1 mm, the problem of bright and dark halos seldom occurs. Therefore, when the ratio of the diffuse reflectance to the parallel reflectance of the optical layer 420 is larger than 5, it is suitable for applying to the thicker light guide plates 400; and when the ratio of the diffuse reflectance to the parallel reflectance of the optical layer 420 is less than 5, it is suitable for applying to the thinner light guide plates 400 to meet the requirements of different thicknesses of the light guide plates 400.

TABLE 1

| Reflection type | Example 1 | Example 2 | Example 3 | Example 4 | Example 5 | Example 6 | Example 7 | Example 8 | Comparative example 1 |
|---|---|---|---|---|---|---|---|---|---|
| T total reflectance | 98% | 100% | 70% | 69% | 84% | 84% | 61% | 84% | 110% |
| parallel reflectance (lower limit) | 13% | 12% | 24% | 27% | 35% | 37% | 31% | 70% | 106% |
| diffuse reflectance | 85% | 88% | 46% | 42% | 49% | 47% | 30% | 14% | 4% |
| A(D/P) | 6.54 | 7.33 | 1.875 | 1.5556 | 1.4 | 1.27 | 1.0333 | 0.2 | 0.04 |
| R | 13.27 | 12.00 | 34.29 | 39.13 | 41.67 | 44.05 | 50.82 | 83.33 | 96.36 |
| parallel reflectance (upper limit) | 16% | 15% | 27% | 30% | 38% | 40% | 34% | 75% | 110% |
| diffuse reflectance | 82% | 85% | 43% | 39% | 46% | 44% | 27% | 9% | 0% |
| A(D/P) | 5.13 | 5.67 | 1.5556 | 1.3 | 1.21 | 1.1 | 0.7941 | 0.12 | 0 |
| R | 16.33 | 15.00 | 38.57 | 43.48 | 45.24 | 47.62 | 55.74 | 89.29 | 100.00 |
| Thickness 1 mm | ○ | ○ | ○ | ○ | ○ | ○ | ○ | ○ | X |
| Thickness 0.7 mm | Δ | Δ | ○ | ○ | ○ | ○ | Δ | Δ | X |
| Thickness 0.55 mm | X | X | ○ | ○ | ○ | Δ | X | X | X |
| Thickness 0.35 mm | X | X | ○ | ○ | ○ | X | X | X | X |

As shown in the table 1, using the optical layers of the example 1 to the example 8 with a condition that the thickness of the main body 410 is less than 1 mm (including the end point), the resulting optical quality can meet the requirements under some conditions. The optical layer 420 of the example 3 has the parallel reflectance of 24%-27% and the diffuse reflectance of 43%-46%, the total reflectance is 70%, and a value of the R is 34.29 to 38.57. The optical layer 420 of the example 4 has the parallel reflectance of 27%-30% and the diffuse reflectance of 39%-42%, the total reflectance is 69%, and a value of the R is 39.13 to 43.48. The optical layer 420 of the example 5 has the parallel reflectance of 35%-38%, the diffuse reflectance of 46%-49%, the total reflectance is 84%, and a value of the R is 41.67 to 45.24. That is to say, in the example 3 to the Regarding the example 6 to the example 8, when the ratios of the diffuse reflectance to the parallel reflectance of the optical layer 420 are less than 1.27 and larger than 0.12, including the end point, the problem of bright and dark halos seldom occurs by coordinating with the main body 410 whose thickness is 0.7 mm to 1 mm, so as to at least meet the requirements of the lower standard. Furthermore, when the thickness of the light guide plate 400 which is larger than 0.7 mm, such as 1 mm, is applied, an optical appearance can be further optimized. If it is further applied to the thinner backlight modules, as shown in example 6, the ratio of the diffuse reflectance to the parallel reflectance of the optical layer 420 is further decreased to be less than 1.27 and larger than 1.1, including the end point, and the thickness of the light guide plate 400 is larger than 0.55 mm and less than 0.7 mm. In this case, although the luminance and the optical quality of the edge of the light guide plate 400 are slightly declined, it still meets the requirements of the lower standard.

Regarding the comparative example 1, the total reflectance of the optical layer of the comparative example 1 is too high, which is close to an optical effect of specular reflection and usually refers to a situation that when the total reflectance exceeds 100%, such that no matter what thickness of the light guide plate is used, the problems such as bright lines occur. That is to say, in the example 1 to the example 8, when ratio of the diffuse reflectance to the parallel reflectance of the optical layer 420 is less than 7.33 and larger than 0.12, and the thickness of the light guide plate 400 is larger than 0.7 mm and less than 1 mm, the light guide plate 400 can generate the better optical quality. Furthermore, according to the example 1 and the example 2, if the thickness of the light guide plate is further thinned to 0.7 mm, it is necessary to maintain the ratio of the diffuse reflectance to the parallel reflectance of the optical layer 420 less than 1.875 to achieve a better effect.

In addition to the above description, in the present embodiment, a percentage value of the parallel reflectance to the total reflectance of the optical layer 420 can be defined as an R. A relational formula between the R, the parallel reflectance and the total reflectance is as follows:
R (%)=((RT−RD)/RT)*100, wherein the RT (%) is the total reflectance, the RD (%) is the diffuse reflectance. In other words, a percentage value of the (RT−RD), which is a percentage value of the parallel reflectance, is based on that the total reflectance of the optical layer 420 is composed of a diffuse reflectance and a parallel reflectance.

Referring to FIG. 1, the main body 410 defines plural light-emitting areas 410b arranged in a matrix. A ratio of an average brightness of the light-emitting areas 410b closest to two opposite sides of the main body 410 to a brightness of the light-emitting area 410b located on a center of the main body 410 is an $R_L$, and the R and the $R_L$ conform to a relational formula, the relational formula is:

$$1 > R_L \geq 7*10^{-6}R^3 - 0.0012R^2 + 0.0582R - 0.0015.$$

Referring to the following table 2, the following table 2 is a comparison table of optical simulated results produced by the optical layers 420 with different R and $R_L$ in plural examples of the present disclosure and a comparative example. In the table 2, the mark "○" indicates that the luminance and the optical quality of the portion of the light guide plate 400 near an edge of the light guide plate 400 meet requirements and no adverse performance occur; the mark "Δ" indicates that the luminance and the optical quality of the portion of the light guide plate 400 near the edge are slightly declined, but still meet the requirements of the lower standard; and the mark "X" indicates that the luminance and the optical quality of the portion of the light guide plate 400 near the edge do not meet the requirements, for example bright lines, dark halos, or other undesirable performance occur.

TABLE 2

| Reflection type | Example A | Example B | Example C | Example D | Example E | Example F | Example G | Example H | Example I | Example J | Comparative example A |
|---|---|---|---|---|---|---|---|---|---|---|---|
| R | 12.00 | 13.27 | 25.00 | 34.29 | 39.13 | 41.67 | 42.50 | 44.05 | 45.00 | 50.82 | 70.00 |
| $R_L$ | 0.54 | 0.58 | 0.81 | 0.87 | 0.86 | 0.85 | 0.84 | 0.83 | 0.83 | 0.78 | 0.59 |
| Thickness 0.55 mm optical taste | X | X | Δ | ○ | ○ | ○ | Δ | Δ | Δ | X | X |
| Thickness 0.35 mm optical taste | X | X | X | ○ | ○ | ○ | X | X | X | X | X |

As shown in the table 2, using the optical layers 420 of the example C to example I with a condition that the thickness of the main body 410 is less than 0.55 mm, including the end point, the resulting optical quality can meet the requirements under some conditions. In the optical layer 420 of the example D, a value of the R is 34.29, and a value of the $R_L$ is 0.87. In the optical layer 420 of the example E, a value of the R is 39.13, and a value of the $R_L$ is 0.86. In the optical layer 420 of the example F, a value of the R is 41.67, and a value of the $R_L$ is 0.85. That is to say, in the example D to the example F, the value of the R of the optical layer 420 is less than 41.67 and larger than 34.28, the value of the $R_L$ is larger than 0.845 and less than 0.875, the problem with the bright lines can be avoided by coordinating with the light guide plate 400 with different thicknesses, that is, the thickness of the main body 410 is less than 0.55 mm, and it can even be applied to the thinner light guide plate 400 with the thickness of 0.35 mm to make the light guide plate 400 generate a better optical quality.

Regarding the example A and the example B, the values of the R of the optical layer 420 in the example A and the example B are both less than 25, and the values of the $R_L$ are both less than 0.8, the problems such as edge bright lines occur, regardless of the thickness of the main body 410 is 0.55 mm or 0.35 mm. Therefore, to make the light guide plate 400 generate the better optical quality, it is necessary to design the value of the R of the optical layer 420 to be larger than 25 or the value of the $R_L$ to be larger than 0.8.

Regarding the example J, the value of the R of the optical layer 420 in the example J is greater than 45, and the value of the $R_L$ is less than 0.8, such that the problems such as edge bright lines occur, regardless of coordinating with the thickness of the main body 410 is 0.55 mm or 0.35 mm. Therefore, to make the light guide plate 400 generate the better optical quality, it is necessary to design the value of the R of the optical layer 420 to be less than 45 or the value of the $R_L$ to be larger than 0.8.

Regarding the example C, the value of the R of the optical layer 420 in the example C is 25, and the value of the $R_L$ is 0.81, which is slightly greater than 0.8, such that the problem of bright and dark halos seldom occurs when coordinating with the main body 410 whose thickness is 0.55 mm. Therefore, when the value of the R of the optical layer 420 is close to 25, and the value of the $R_L$ is slightly larger than 0.8, it is suitable to be applied to the thicker light guide plate 400 to generate the required optical quality. On the contrary, if the value of the $R_L$ is less than 0.845 and is applied to the thinner light guide plate 400, for example the thickness of the main body 410 is 0.35 mm, the optical quality does not meet the requirements.

Regarding the example G, the example H and the example I, the value of the R of the optical layer 420 in the example G is 42.50, and the value of the $R_L$ is 0.84. The value of the R of the optical layer 420 in the example H is 44.05, and the value of the $R_L$ is 0.83. The value of the R of the optical layer 420 in the example I is 45.00, and the value of the $R_L$ is 0.83. The values of the R of the example G, the example H and the example I are larger than 42.50 and less than 45.00, the values of the $R_L$ are less than 0.84, so that the problem with bright and dark halos is less likely to occur by coordinating with the main body 410 whose thickness is 0.55. Therefore, when the value of the $R_L$ of the optical layer 420 is less than 0.84, it is suitable to be applied to the thicker light guide plate 400 to generate the required optical quality. However, if it is applied to the thinner light guide plate 400, for example the thickness of the main body 410 is 0.35 mm, the optical quality does not meet the requirements because the value of the $R_L$ is less than 0.845.

Regarding the comparative example A, the value of the R of the optical layer of the comparative example A is 70, which is larger than 45, and the value of the $R_L$ is 0.59, which is less than 0.8. The problems such as edge bright lines occur, regardless of coordinating with the thickness of the main body 410 is 0.55 mm or 0.35 mm.

Figure 3:
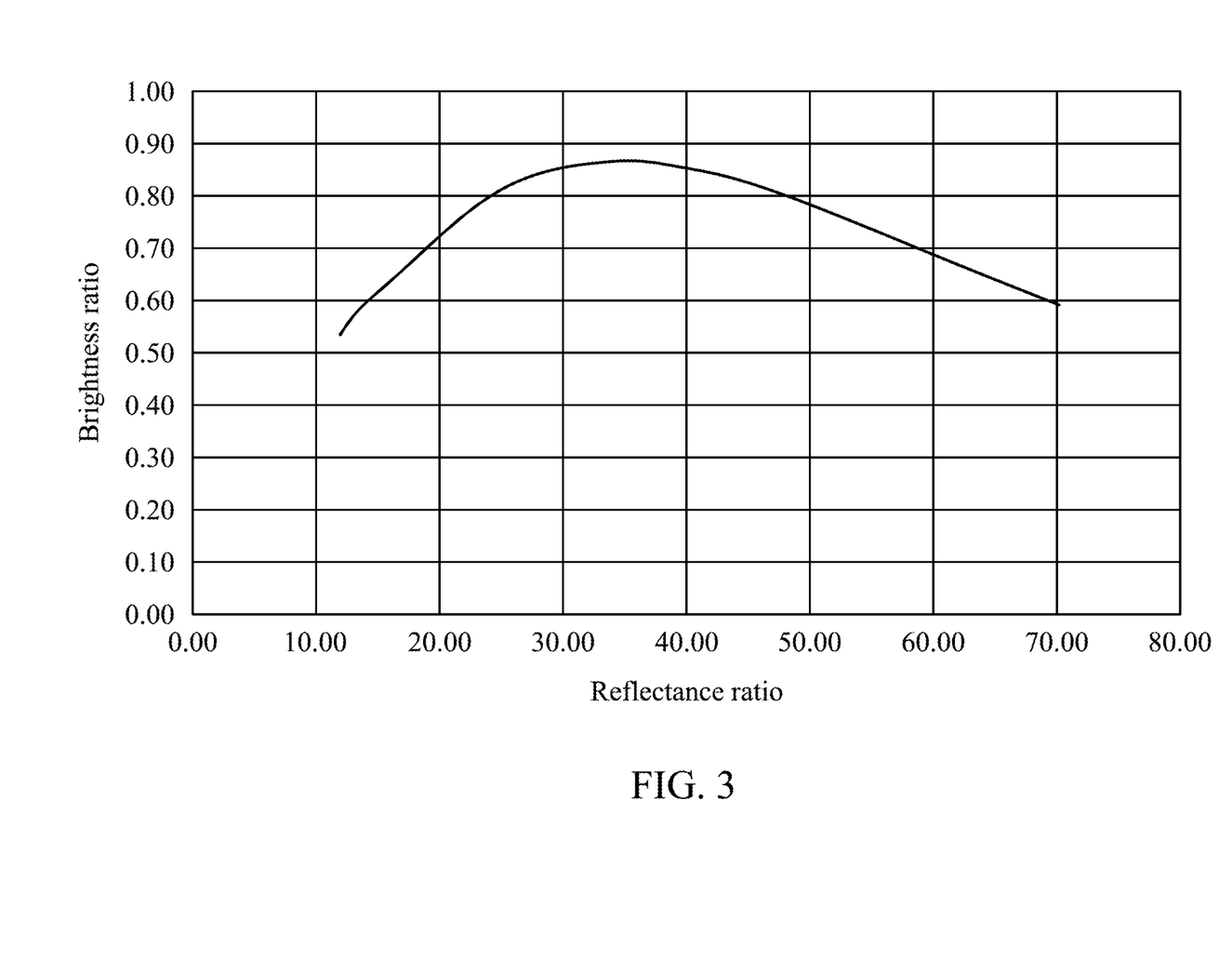
FIG. 3 is a graph showing a relationship between a reflectance ratio and a brightness ratio in accordance with an embodiment of the present disclosure.

Referring to the table 2 and FIG. 3, a horizontal axis of FIG. 3 is the percentage value (R) of the parallel reflectance to the total reflectance of the optical layer 420, and a vertical axis is the ratio ($R_L$) of the average brightness of the light-emitting areas 410b closest to two opposite sides of the main body 410 to the brightness of the light-emitting area 410b located on a center of the main body 410. When it selects that the value of the R of the optical layer 420 is less than 45 and larger than 25, including the end point, or the value of the $R_L$ is larger than 0.8 and less than 1, an area close to and above a head of a curve at least meets the requirements of the lower standards of the optical quality. Preferably, it selects that the value of the R of the optical layer 420 is less than 41.67 and larger than 34.29, including the end point, or the value of the $R_L$ of the optical layer 420 is larger than 0.845 and less than 0.875. That is, the area close to and above the head of the curve has a better optimization effect, the thicker light guide plate 400 whose thickness is 0.55 mm meets the requirements of better optical taste, and it can further be applied to the thinner light guide plate 400 whose thickness is 0.35 mm.

Specifically, when the value of the R of the optical layer 420 increases from 25 to 39.13, the value of the $R_L$ also increases from 0.81 to 0.87 as the value of the R increases. When the value of the R of the optical layer 420 increases from 39.13 to 45, the value of the $R_L$ also decreases from 0.87 to 0.83 according to the value of the R increases. Therefore, when the value of the R continues to increase from 45, the value of the $R_L$ also continues to decrease to be lower than 0.8, and then the bad performance, such as bright lines and dark halos cannot be solved, and the optical quality does not meet the requirements. Therefore, it doesn't mean that the value of the R of the optical layer 420 gets larger, the better the optical quality will be. Conversely, when the value of the R continues to decrease from 25, the value of the $R_L$ also continues to decrease to be below 0.8, and then the bad performance, such as bright lines and dark halos cannot be solved, and the optical quality does not meet the requirements. Therefore, it doesn't mean that the value of the R of the optical layer 420 gets smaller, the better the optical quality will be. Thus, when the value of the R is larger than 45 or less than 25, there are bad effects on the optical quality. Therefore, for person having ordinary skill in the art, only based on the disclosure of the present invention, the most suitable value range of the R of the optical layer 420 can be selected to achieve good effects of solving the light leakage and the bright lines.

It can be known from the above embodiments, an advantage of the present disclosure is that the optical layer is disposed on the side surface of the light guide plate. Through the optical layer disposed on the side surface of the light guide plate and the designed percentage value of the parallel reflectance to the total reflectance, it can reduce the light emit out from the side surface of the light guide plate, and increase the light utilization rate of the light guide plate simultaneously, so that the light leakage and the bright lines can be solved, thereby increasing the optical quality of the overall backlight module and the display device can be increased. In other words, a percentage value design, which is less than or larger than the ratio of the parallel reflectance to the total reflectance of the present disclosure, can't achieve a good effect of solving the light leakage and the bright lines. The light guide plate of the present disclosure can improve the aforementioned purpose, so it can further meet the requirements and expectations of the market for narrow frame backlight modules.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A light guide plate, comprising:
a main body having a light-incident surface, a side surface and an optical surface, wherein the light-incident surface and the side surface are respectively connected to the optical surface; and
an optical layer correspondingly disposed on the side surface of the main body;
wherein in a reflectance characteristic of the optical layer, a total reflectance of the reflectance characteristic is composed of a diffuse reflectance and a parallel reflectance, and a percentage value of the parallel reflectance to the total reflectance is defined as an R;
wherein the main body defines a plurality of light-emitting areas, wherein a ratio of an average brightness of the light-emitting areas closest to two opposite sides of the main body to a brightness of the light-emitting area located on a center of the main body is an $R_L$, and the R and the $R_L$ conform to a relational formula, the relational formula is:

$$1 > R_L \geq 7*10^{-6}R^3 - 0.0012R^2 + 0.0582R - 0.0015;$$

wherein a value of the $R_L$ is larger than 0.8 and less than 1; and
wherein a value of the R is equal to or larger than 34.29 and equal to or less than 45.

2. The light guide plate of claim 1, wherein the reflectance characteristic is that light is reflected into the main body by the optical layer.

3. The light guide plate of claim 1, wherein the value of the $R_L$ is larger than 0.845 and less than 0.875.

4. The light guide plate of claim 1, wherein a ratio of the diffuse reflectance to the parallel reflectance of the optical layer is equal to or less than 7.33 and equal to or larger than 0.12, and a thickness of the main body is equal to or larger than 0.7 mm and equal to or less than 1 mm.

5. The light guide plate of claim 1, wherein a ratio of the diffuse reflectance to the parallel reflectance of the optical layer is equal to or less than 1.875 and equal to or larger than 1.21, and a thickness of the main body is equal to or less than 1 mm.

6. The light guide plate of claim 1, wherein a ratio of the diffuse reflectance to the parallel reflectance of the optical layer is equal to or less than 1.27 and equal to or larger than 0.12, and a thickness of the main body is equal to or larger than 0.7 mm and equal to or less than 1 mm.

7. The light guide plate of claim 1, wherein a ratio of the diffuse reflectance to the parallel reflectance of the optical layer is equal to or less than 1.27 and equal to or larger than 1.1, and a thickness of the main body is equal to or larger than 0.55 mm and equal to or less than 1 mm.

8. The light guide plate of claim 1, wherein the optical layer directly contacts the side surface.

9. A display device, comprising:
a light guide plate of claim 1;
a light source adjacent to the light-incident surface of the light guide plate;
at least one optical film arranged in front of the optical surface of the light guide plate; and
a display panel arranged in front of the at least one optical film.

10. The light guide plate of claim 4, wherein the ratio of the diffuse reflectance to the parallel reflectance of the optical layer is equal to or less than 1.875.

11. A backlight module, comprising:
a light guide plate of claim 1;
a light source adjacent to the light-incident surface of the light guide plate; and
at least one optical film arranged in front of the optical surface of the light guide plate.

12. The light guide plate of claim 5, wherein the thickness of the main body is equal to or larger than 0.35 mm and equal to or less than 0.7 mm, and the ratio of the diffuse reflectance to the parallel reflectance of the optical layer is equal to or larger than 1.3.

13. An optical component, comprising:
a main body having a light-incident surface, a side surface and an optical surface, wherein the light-incident surface and the side surface are respectively connected to the optical surface;
a reflectance characteristic being composed of a diffuse reflectance and a parallel reflectance, and a percentage value of the parallel reflectance to a total reflectance is defined as an R;
wherein the main body defines a plurality of light-emitting areas, wherein a ratio of an average brightness of the light-emitting areas closest to two opposite sides of the main body to a brightness of the light-emitting area located on a center of the main body is an $R_L$, and the R and the $R_L$ conform to a relational formula, the relational formula is:

$$1 > R_L \geq 7*10^{-6}R^3 - 0.0012R^2 + 0.0582R - 0.0015;$$

wherein a value of the $R_L$ is larger than 0.8 and less than 1, and
wherein a value of the R is equal to or larger than 34.29 and equal to or less than 45.

14. The optical component of claim 13, comprising:
an optical layer correspondingly disposed on the side surface of the main body;
wherein the optical layer comprises the reflectance characteristic.

15. The optical component of claim 13, wherein the value of the $R_L$ is larger than 0.845 and less than 0.875.

* * * * *